April 15, 1969 C. E. GUTSHALL 3,438,299
EXTRUDING SCREW
Filed Jan. 26, 1968 Sheet 1 of 2
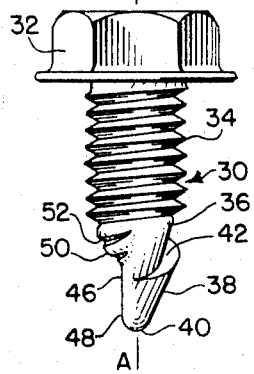
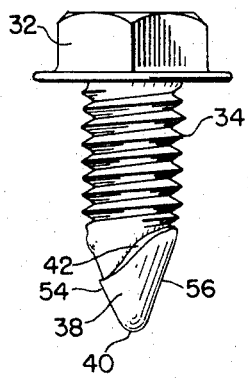
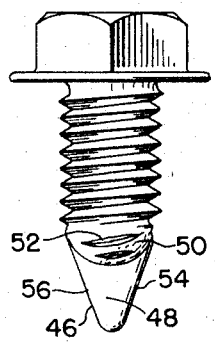
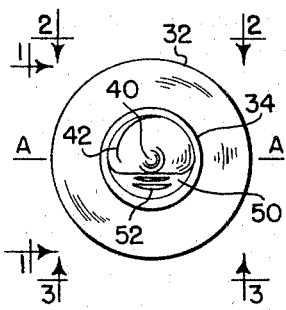
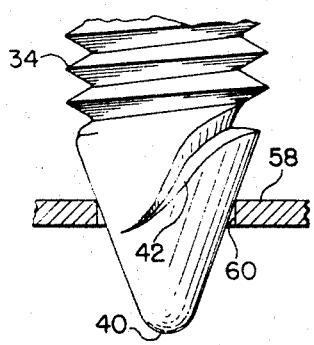
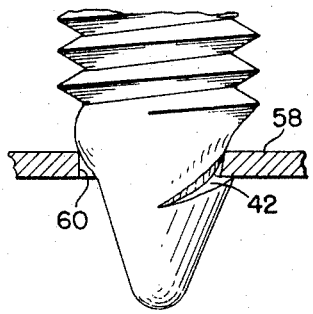
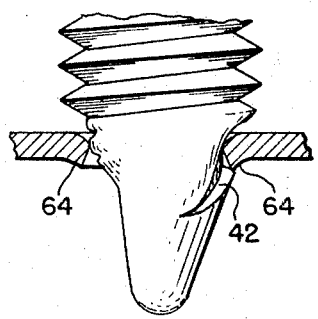
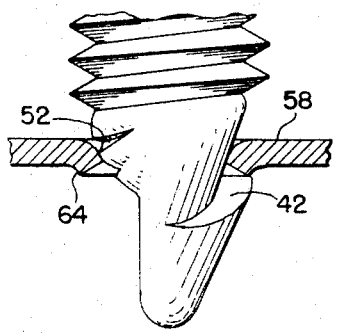
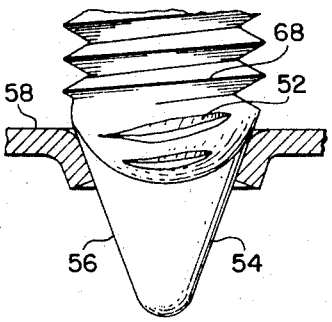
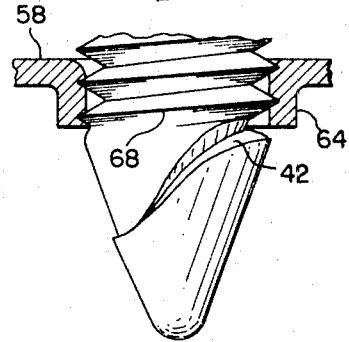
INVENTOR.
Charles E. Gutshall
BY
His Att'ys

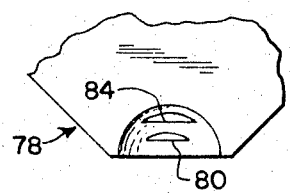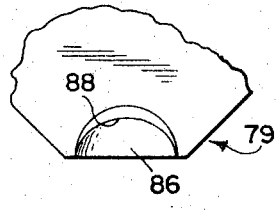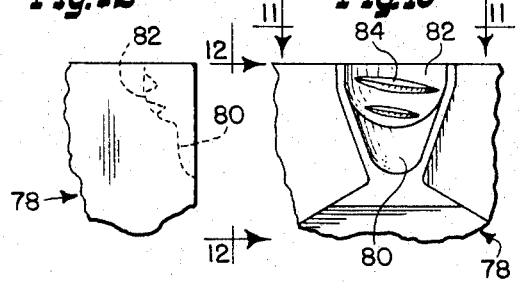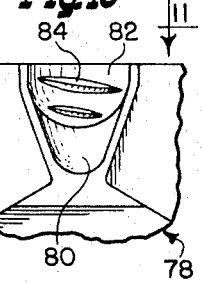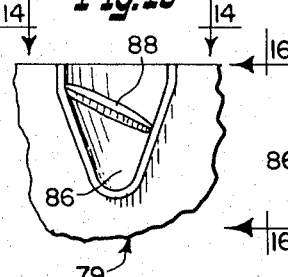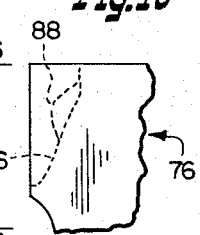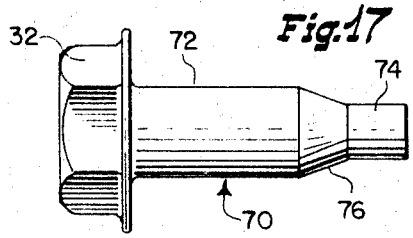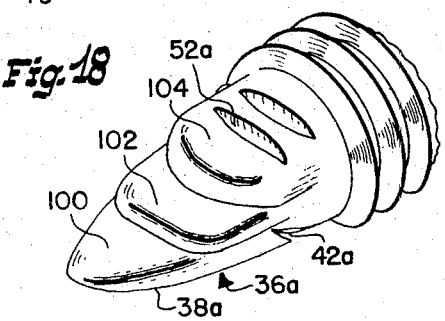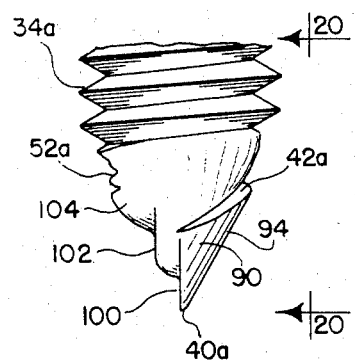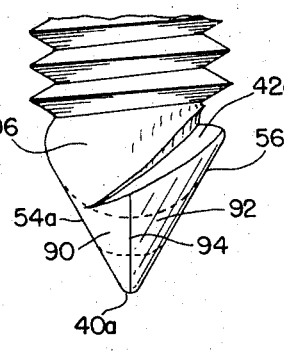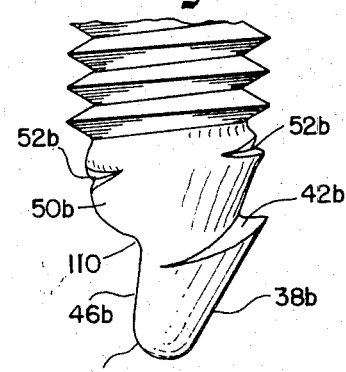

United States Patent Office 3,438,299
Patented Apr. 15, 1969

3,438,299
EXTRUDING SCREW
Charles Edward Gutshall, Roselle, Ill., assignor to Illinois Tool Works Inc., Chicago, Ill., a corporation of Delaware
Filed Jan. 26, 1968, Ser. No. 700,872
Int. Cl. F16b *25/00;* B21k *1/56*
U.S. Cl. 85—41                                     12 Claims

ABSTRACT OF THE DISCLOSURE

A pinch-pointed gimlet point type screw having a specific point configuration for expanding and extruding an undersized sheet metal aperture to accept the screw and provide increased thread engagement with the threaded screw shank. This screw can also be provided with self-drilling features.

Background of the invention

This invention relates to reaming and extruding screws for use with thin sheet metal panels. Heretofore, screws have been provided with bulletnose like points which have been designated gimlet points and usually have widely spaced threads for use in sheet metal applications. By application of axial pressure to the screw the aperture in the thin sheet metal panel was slightly deformed downwardly by the gimlet point and the spaced threads gripped the sheet material on opposite sides of the material or alternatively formed partial threads in the aperture. Other forms of screws utilizing spade or shovel type points have been used to ream the hole or aperture in sheet metal to accommodate a specific screw diameter which normally would not be accommodated due to tolerance variations, primarily on the low side.

Summary of the invention

The present invention provides a headed screw having driving means at one extremity, a threaded shank, and a tapered forged reaming and spin extruding work penetrating portion at the end of the screw opposite the head. The work penetrating portion has two integral dissimilar segments falling on opposite sides of a plane coincident with the axis of the screw. One segment generally defines one-half of a gimlet-like work penetrating portion and has a spiral flute impressed therein. The second segment is of lesser radial extent than the first segment at the free tip extremity of the work penetrating portion and is divided into at least two portions, the first portion of which extends from the tip a predetermined axial extent and a second portion which blends radially outwardly and upwardly from the first portion to the juncture with the threaded shank. A screw having the configuration described above is capable of being utilized in an undersized hole in a sheet metal panel wherein the tapered point with its spiral flute engages the edge of the aperture and through rotation of the screw tends to not only draw the screw into the aperture but to also form the margins of the aperture downwardly and to create an extrusion. The extrusion exposes more axial extent of material and hence provides a greater area for engagement by the threads of the shank. The second portion of the second segment which blends radially outwardly and upwardly can be provided with partial threads which also engage the wall of the extruded hole and further draw the screw into the hole for engagement by the threaded shank.

A basic object of the invention, therefore, is to provide a screw which is capable of reaming and extruding an undersized sheet metal aperture without excessive pressures being applied axially to the screw and also without seriously increasing the torque required to drive the screw.

Another object of the present invention is to permit the use of fine machine threads rather than spaced threads on screws used in sheet metal applications and hence increase the tensile forces required to pull a screw or to strip the screw thread relative to its engagement. A further object is to provide a screw of the type contemplated by this invention wherein a self-drilling feature is incorporated in the tip to permit the screw to drill its own hole, enlarge the hole and extrude the metal surrounding the drilled aperture.

Another object of the invention is to provide a forged or pinch-pointed screw having the features set forth herein above which is capable of being manufactured economically and utilized in sheet metal applications with a minimum of operator effort.

Further objects will become apparent when the specifications is read in conjunction with the drawings.

Description of drawings

FIG. 1 is a side elevational view of a preferred embodiment of the present invention taken along line 1—1 of FIG. 4;

FIG. 2 is a frontal elevation of the same screw rotated 90° clockwise when viewed along line 2—2 of FIG. 4;

FIG. 3 is a rear elevation of the same screw rotated 180° from FIG. 2 and as viewed along line 3—3 of FIG. 4;

FIG. 4 is an end view of the work penetrating portion of the screw looking toward the head;

FIGS. 5 through 10 are views of the penetrating portion of the screw shown in FIGS. 1–4 as it is introduced and rotated within a thin work piece aperture showing the development of the extruded material adjacent to the work piece aperture;

FIG. 11 is a partial top view of one jaw of a pinch point die set used to forge one segment of the work penetrating portion as viewed along line 11—11 of FIG. 13;

FIG. 12 is a partial side view in phantom showing the same pinch point jaw as viewed along line 12—12 of FIG.13;

FIG. 13 is a partial elevation of the same pinch point jaws;

FIG. 14 is a partial top view, taken along line 14—14 of FIG. 15, of the mating jaw of the pinch point die set used for forming a second segment of the work penetrating portion;

FIG. 15 is a partial elevation of the mating pinch point jaw;

FIG. 16 is a partial elevational side view taken along line 16—16 of FIG. 15;

FIG. 17 shows a typical headed blank used to form the preferred embodiment;

FIG. 18 is a perspective view of a second embodiment of the present invention;

FIG. 19 is a partial elevational view of the work penetrating portion of the embodiment shown in FIG. 18;

FIG. 20 is a partial elevational view of the work penetrating portion as viewed along line 20—20 of FIG. 19; and FIG. 21 is a partial elevational view of a modification to the present invention.

Description of preferred embodiments

Referring now to the drawing and particularly FIGS. 1–4, wherein, a screw 30 embodying the teachings of the present invention includes a head 32, a thread shank 34 and a work penetrating portion 36. The head is provided with suitable means to accept rotation inducing means, i.e. wrenching faces or recesses to accept a driver. The shank is threaded through a substantial portion of its length and preferably with machine threads, although, spaced or sheet metal threads are acceptable.

The work penetrating portion 36, which embodies the inventive concept, includes two segments falling on opposite sides of a plane coincident with the axis of the screw. Such a plane would be perpendicular to the surface of the drawing in the view shown in FIGS. 1 and 4 and would fall on the axis of the screw. This is defined in would fall on the axis of the screw. This is defined in FIG. 1 by the line A—A and in FIG. 4 by a similar designation. The first segment 38 is generally defined by one-half of a gimlet-like or bulletnosed point generally triangular in axial cross-section, as seen in FIG. 2, with the tip or apex 40 of the triangle being rounded to form substantially one-half of a hemisphere. Intermediate the axial extent of segment 38 there is provided a spiral flute 42 which has the same hand as the threads on the shank 34 but preferably has a variable pitch which is rather high at its lower extremity and then blends into the pitch of the threads on shank 34. Flute 42 may take the form of an upwardly facing shoulder with a radially reduced portion in the part of segment 38 falling between the flute and the threaded shank or alternatively can be defined as a deep groove. In either case, the entire work penetrating portion is forged or pinch pointed in the screw for purposes of ease in fabrication. The general configuration of flute 42 can be best seen in the front elevation shown in FIGS. 2, 5, 7 and 10.

The second segment 46 of the work penetrating portion 36 is best viewed in FIGS. 1 and 3 and includes a first portion 48 which extends from the tip 40 less than the predetermined axial extent of work penetrating portion 36. The lower extremity of first portion 48 is rounded and blends into the rounded tip 40 to substantially complete the hemispherical tip configuration shown in this embodiment. A second portion 50 extends upwardly and outwardly from the upper limits of first portion 48 to blend with the juncture of the work penetrating portion 36 with said shank 34, preferably on a circle having a diameter greater than the minor diameter and less than the pitch diameter of the threaded portion of said shank. Second portion 50 is provided with at least one or more partial threads 52 which have the same hand as said shank thread. The pitch of these partial threads can be equal to or greater than the pitch of the threads on the threaded shank 34.

As can be seen from this description the two segments of the work penetrating portion 36 are unsymmetrical when viewed parallel to the plane A which is coincident with the axis and symmetrical when viewed perpendicular to this plane. Reference to FIG. 1 reveals the unsymmetrical arrangement while FIGS. 2 and 3 show the symmetry when the screw is rotated 90° in either direction. Further evidence of this is to be found in the end view shown in FIG. 4. The two edges 54–56 formed, on plane A—A, at the juncture of the two segments, diverge outwardly and upwardly from tip 40 for purposes best set forth hereinafter.

Referring now to FIGS. 5 through 10, which show the operation of this screw, a screw 30, of the type described above, is inserted by the operator into an undersize prepunched hole or aperture 60 in the sheet metal panel 58. It has been found that the screw is usable in thicknesses of panel varying from less than .015 inch to in excess of .050 inch. Preferably hole 60 is substantially less than the pitch diameter of the thread on shank 34. Rotation of the screw by the operator engages flute 42 with the edge wall of the aperture 60. As rotation continues, the flute 42 draws the screw downwardly into the aperture and flute 42 also tends to deflect the edge of the aperture downwardly. The symmetrical diverging edges 54–56, at the juncture of the two segments of the work penetrating portion, extrude the sheet material downwardly as shown in FIGS. 7 and 9. The extruded portion 64 is continued to be drawn outwardly as the screw rotates. When the penetration of the screw reaches the second portion 50, the partial threads 52 bite into the extrusion 64 and assists the flute 42 in drawing the screw downwardly. The diverging walls 54–56 continue to expand the extrusion radially outwardly and the partial thread or threads 52 draw 68 on the shank 34 engage the walls of the extrusion to the screw into a position where the lowermost threads form a thread and continue to pull the screw into associated relationship with the panel 58. The screw 30 is a hardened screw which permits the threads 68 to form their own impression on the inner wall of the extrusion 64 and to bring the screw into final fastened relation to the panel 58. In situations where the screw is utilized with porcelain materials the heat treating of the screw substantially eliminates wear, galling or deformation during the passage through porcelain materials. It must be appreciated that FIGS. 5 through 10 are partial sectional views taken at various points around the aperture during the rotation of the screw in its spin extrusion of the plate 58 and were chosen solely to illustrate the operation of various portions of the work penetrating portion of the screw.

Preferably, a screw of the type described above is driven by a power tool. It has been found that the spinning of the screw and its resultant extrusion of the metal creates heat which helps to provide the maximum amount of extrusion. The spinning, together with resultant heat created, helps to form a strong extrussion and strong close mating of the male threads of the screw with the formed female threads in the extrusion. The extrusion of material increases the area available for engagement and thereby adds to the number of threads engageable by the screw in the panel. This provides an increase in the pull out strength and stripping torques. The cooling down of the spun extruded hole with its initially formed close mating thread causes it to shrink around the screw thread providing an even closer mating fit with a higher prevailing torque for removal, which is a major deterrent to vibratory loosening factors. If desired, the clamping face of the head 32 can be provided with "torque robbers," not shown, such as nibs of the type found in U.S. Patent No. 2,833,326 issued to F. K. Knohl. In the thinner sheet materials such "torque robbers" assist in building up torque when the head reaches its clamping position so that the automatic clutches in the drivers will disengage prior to stripping the threads formed in the panel. When holes in heavier materials such as those over .050 inch are punched, because of the greater clearances between the punch and die, the holes vary from the smaller and more accurate close grain punch side at the top to the larger and more irregular coarse grain at the far side or die side. This coarse grain generally is weaker and produces threads which vary considerably in strength when used with standard gimlet point screws. By providing the optimum hole size, the spin extrusion screw prepares the hole by moving material downward and strengthens the weaker coarse grained areas. Since more heat is created in the spin extruding of heavier metals the formation of threads become easier. When the fastening is accomplished and the panel cools down a greater shrinkage occurs around the screw threads providing a more intimate fit of the components. This increases the breakaway torque considerably and provides a high prevailing loosening torque adding greatly to the sustained holding capabilities.

An additional advantage to the screw is found in the rounded tip. Service men often complain about screws cutting or scratching the skin on hands and arms where insufficient space and clearances are lacking in equipment, whereas, the rounded end of this screw eliminates much of this problem.

The main advantage, however, of the screw described above is that thicknesses of sheet material used may be reduced since the screw by spin extrusion increases the area available for contact which provides a greater number of threads in engagement and hence increases the holding power of the screw. The reduction of a single gauge of material thickness where large quantities of sheet metal are used may often provide huge savings many times the cost of the screw.

Referring now to FIGS. 11 through 17, a screw of the type described hereinabove is best formed by cold heading a blank 70 having a head 32 an unthreaded shank 72 and a pilot portion 74 connected to the shank by a tapering section 76. This blank is then forged between a pair of opposed pinch pointing dies or jaws, of the type shown in FIGS. 11 through 13 and 14 through 16, in the normal accepted practice. The cavity of one die or jaw 78 bears an impression which is the reverse or mirror image of one segment of the work penetrating portion 36. In the particular instance illustrated, the jaw shown in FIGS. 11–13 would form the second segment having its two portions 48–50 as represented by the forging portions 80 and 82 respectively. The partial thread 52 would be formed by the male impression 84. The second jaw 79 shown in FIGS. 14–16 would form the first segment 38 and its associated flute 42 by means of the portions 86 and 88 respectively. After the work penetrating portion 36 has been formed on the tapering section 76 and pilot portion 74, and the scraps removed, the unthreaded shank 72 is thread-rolled to provide the threaded shank 34. The forging of a screw point by means of pinch-pointing jaws is an automatically fed rapid process which is known in the art. The screw is then heat treated in recognized fashion and is ready for use.

A second embodiment of the present invention is shown in FIGS. 18 through 20 wherein similar parts bear similar numerals with the addition of the suffix "a." As has been previously mentioned this screw is ideally adapted to be converted from a simple spinning extrusion screw to a self-drilling spinning extrusion screw. In this second embodiment the first segment 38a of the work penetrating portion 36a is substantially identical to the previous embodiment except that the lower portion is defined not by a smooth curvilinear surface but rather by semi-pyramidal shape which gives two diverging substantially flat surfaces 90 and 92 which at their line of juncture 94 gives an additional sharp extruding surface to assist the side edges 54a and 56a in the spinning extrusion process. The portion 96 above the spiral flute 42a is generally curvilinear as it was in the first embodiment.

The major change in this embodiment takes place in the second segment which includes a first portion 100 which falls on the axis of the screw. Portion 100 is preferably substantially flat but for certain applications may be slightly concave. A second portion 102 is axially spaced from the rounded tip 40a and is radially displaced from the axis of the screw. A third portion 104 extends outwardly and upwardly from its juncture with portion 102 to blend into the shank 34a. One or more partial threads 52a are preferably impressed therein for the same purposes as threads 52 in the first embodiment. The axial extent of the first portion 100, from the tip 40a to the second portion 102, is substantially equal to or in excess of the thickness of the material with which this screw is to be utilized. It has been found that such a screw when rotated at proper speeds will drill a small aperture in sheet material and will then operate in the same fashion as the previously described embodiment by drawing the thin material downwardly into an expanded extruded aperture whereby greater thread engagement can be obtained by the threaded shank 34a.

It should be noted that the semi-pyramidal shape of the first segment is not a necessity for utilization of this screw as a self-driller. The device will work equally well if the first segment is curvilinear as shown in the first embodiment described.

A third embodiment of the present invention is shown in FIG. 21 wherein similar parts will be designated by similar numerals with the addition of the suffix "b." This work penetrating portion is substantially identical to the first embodiment described in that it is provided with a first segment 38b having a spiral flute 42b. The second segment 46b has at the juncture of its first portion 48b and its second portion 50b a deep transverse slot 110, the basic function of which is to move material during the forging operation into and for purposes of filling out the first segment 38b. Partial threads 52b may be provided not only in the second segment but in the first segment as well to assist in pulling the screw into the extruded work piece aperture.

Each of the embodiments described hereinabove permits the screw to enter a radically undersized hole and without undue or unreasonable axial pressure to draw itself into said hole, all the while spin extruding or by swaging enlarging said hole to suit the threads following the work penetrating portion. Normally, 15 to 20 pounds of axial pressure, which is identical to the force required to keep a Phillips driver bit engaged in a screw recess during driving, is sufficient to cause this screw to function properly. It has been found that by concaving the flat side of the first portion 100 in the second embodiment that a satisfactory self-drilling wood screw point is developed. It has also been found that a straight shank blank can be used as well as the extruded blank shown in FIG. 17. The forging of the point permits practical manufacture of a fine machine screw threaded screw with a gimlet type point in an economical fashion. Laboratory tests show that a number 12 screw (.216 inch O.D.) when used with sheet metal .032 inch thick having .150 inch drilled holes could be driven with a maximum drive torque of 14 in. lbs. and in the process extruded the material thickness from said .032 inch to .074 inch. It is obvious that the pull out resistance is increased due to increased thread contact. In comparison, a number 12 single slot thread cutting screw was tested in sheet metal .032 inch thick with .150 inch drilled holes. The point would not enter the material until the hole had been increased from .150 to .171 at which size the drive torque was 20 in. lbs. or 57% harder to drive than the instant screw. A single slot thread cutting screw two sizes smaller than the number 12 screw of the invention (a number 10 type 1) drove at 11 in. lbs. or nearly as great as the 14 in. lbs. experienced with the invented screw. Thus, a heavier, stronger screw utilizing the teachings of this invention can be used in thin sheet materials with machine screw threads which previously were impossible to use in tis type of application.

I claim:

1. A forged point reaming and extruding screw having a head, a shank and a work penetrating portion at the end of said screw opposite said head, said work penetration portion having a predetermined axial extent and two integral dissimilar segments falling an opposite sides of a plane coincident with the axis of said screw, one segment defining one-half of a gimlet-like work penetrating portion and having a spiral flute impressed therein, the second segment having a first portion which extends from the tip of said work penetrating portion less than said predetermined axial extent and being substantially parallel to said axis and said plane coincident with the axis of said screw and stopping short of the juncture of said work penetrating portion and said shank, said second segment having a second portion which blends radially outwardly and upwardly from said first portion to the juncture with said shank, the margins at the juncture of said segments on said plane forming a generally uniform tapered work penetrating portion whereby said work penetrating portion is substantially uniform when viewed perpendicular to said plane and eccentric when viewed parallel to said plane.

2. A screw of the type claimed in claim 1 wherein said other portion of said second segment is provided with partial threads having the same hand as said shank threads.

3. A screw of the type claimed in claim 1 wherein said tip of said work penetrating portion is hemi-spherical.

4. A screw of the type claimed in claim 1 wherein said second segment has its first portion spaced from said axis.

5. A screw of the type claimed in claim 1 wherein said second segment has its first portion on said plane and axis, its second portion including an element parallel to but spaced from said plane and another element blending outwardly with said shank.

6. A screw of the type claimed in claim 5 wherein said first portion is concave away from said axis.

7. A screw of the type claimed in claim 5 wherein said other element includes at least circumferentially partial threads.

8. A screw of the type claimed in claim 1 wherein said shank is threaded and said spiral flute has a variable pitch which is substantially equal to the pitch of said shank at the juncture of said work penetrating portion and said shank.

9. A screw of the type claimed in claim 8 wherein said other portion of said second segment is provided with partial threads having the same hand as said shank thread.

10. A screw of the type claimed in claim 8 wherein said spiral flute has an increasing depth and width as it travels up said work penetrating portion in the direction of said shank.

11. A screw of the type claimed in claim 8 wherein said first portion of said second segment has a deep indentation transverse to the axis.

12. A screw of the type claimed in claim 11 wherein at least one partial thread of the same hand as the threads on said shank are imposed on said second portion and on the portion of said first segment between said spiral flute and its juncture with said shank.

References Cited

UNITED STATES PATENTS

| 2,382,019 | 8/1945 | Miller | 85—41 |
| 3,094,894 | 6/1963 | Broberg | 85—47 |
| 3,207,024 | 9/1965 | Sommer | 85—47 |

FOREIGN PATENTS

| 241,588 | 7/1960 | Australia. |
| 696,358 | 10/1964 | Canada. |
| 412,637 | 7/1910 | France. |
| 1,365,015 | 5/1964 | France. |

MARION PARSONS, JR., *Primary Examiner.*

U.S. Cl. X.R.

10—27